(12) United States Patent
Axelrod

(10) Patent No.: US 7,063,868 B2
(45) Date of Patent: Jun. 20, 2006

(54) METHOD OF REMOVING MOLDED NATURAL RESINS FROM MOLDS UTILIZING LIFTER BARS

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 426 days.

(21) Appl. No.: 10/376,737

(22) Filed: Feb. 28, 2003

(65) Prior Publication Data

US 2004/0170733 A1    Sep. 2, 2004

(51) Int. Cl.
*A23P 1/10* (2006.01)

(52) U.S. Cl. ............... 426/512; 426/513; 426/516; 426/805; 426/389; 425/556

(58) Field of Classification Search ............... 426/512, 426/513, 389, 456, 516, 805; 425/556
See application file for complete search history.

(56) References Cited

U.S. PATENT DOCUMENTS

| 4,163,540 A | 8/1979 | Cafarelli ............... 249/67 |
| 4,416,602 A | 11/1983 | Neumeister ............... 425/130 |
| 4,891,002 A | 1/1990 | Inaba et al. ............... 425/556 |
| 4,929,170 A | 5/1990 | Boskovic ............... 425/556 |
| 5,122,051 A | 6/1992 | Joyner ............... 425/556 |
| 5,795,610 A * | 8/1998 | London ............... 426/512 |
| 6,110,521 A * | 8/2000 | Axelrod ............... 426/549 |
| 6,159,516 A | 12/2000 | Axelrod et al. ............... 426/456 |
| 6,379,725 B1 * | 4/2002 | Wang et al. ............... 426/72 |

OTHER PUBLICATIONS

International Search Report (3 pgs) and Written Opinion of the International Searching Authority (3 pgs) issued in the corresponding International Patent Application No. PCT/US04/05991.

* cited by examiner

*Primary Examiner*—Milton Cano
*Assistant Examiner*—Sarah L. Kuhns
(74) *Attorney, Agent, or Firm*—Grossman, Tucker, Perreault & Pfleger, PLLC

(57) ABSTRACT

A process of injection molding a natural resin into a mold cavity including lifter bars as part of the ejection system for extracting the molded animal chew of the mold cavity. The lifter bars are provided with a contacting area having a relatively high surface area ratio relative to surface area of the molded part that remains in contact with the mold after injection and mold opening.

5 Claims, 2 Drawing Sheets

US 7,063,868 B2

METHOD OF REMOVING MOLDED NATURAL RESINS FROM MOLDS UTILIZING LIFTER BARS

FIELD OF THE INVENTION

The present invention is directed at a system for molding an animal chew, and more particularly at a system for molding an animal chew made of natural resin which provides an improved apparatus and method for removal of such molded products from a molding machine.

BACKGROUND OF THE INVENTION

Most dogs enjoy chewing on things, although preferences vary as to the hardness of the substances favored. Some dogs like to chew on very hard materials such as cow bones, wood, nylon, others prefer softer chews such as polyurethane or rubber while still others favor freeze dried snacks. Some dogs, due to their age, may not be able to chew on the very hard substances. Young dogs have insufficiently developed teeth, while old dogs may have diseased gums or may have lost some of their teeth.

The growing trend in the area of animal chews has been directed toward the area of edible chews that are wholly digestible. Many such edible or digestible chews have been developed. Generally these chews are formed from "natural resins". Examples of natural resins that may be used for animal chews may include casein, potato starch, vegetable starch, vegetable matter, or comminuted rawhide as a primary ingredient. Typically, such primary ingredient is combined with various attractants and/or flavorings to make the chew more desirable.

Edible/digestible animal chews have been manufactured by first combining the natural base ingredient, i.e., casein, potato starch, vegetable starch, vegetable matter, or comminuted rawhide, with desired attractants and/or flavorings. The combined ingredients may then be injection molded into a desired shape, such as a dog bone, etc. However, the molding operation of such resins has been found to be problematic.

Specifically, the natural ingredients tend to assume tacky or sticky surfaces as molded, and often may exhibit a great deal of adhesion to the mold cavity. This makes it very difficult to extract the molded chew from the mold without damaging the chew. The edible/digestible nature of the chew further complicates extraction by limiting the available mold release that may be advantageously used if such mold release is undesirably absorbed into the chew toy at an unacceptable level.

Additionally, at the time of demolding, animals chews molded from natural resins are typically very soft in character. This soft character in conjunction with the sticky nature further complicates the forming processes. Specifically, conventional ejector pins present a relatively small surface area that, in combination with the resistance to demolding, results in a large amount of pressure being applied to the soft chew at the region of the ejector pin. This large pressure often results in the ejector pin punching into, or even through the molded chew. Not only does this produce a cosmetic defect in the chew, but can also further complicate demolding, as the chew may now be skewered on an ejector pin. At the very least, the high localized pressure of the ejector pin may result in a cosmetic defect in the form of a circular indentation.

Accordingly, it is an object of the present invention to address the problems associates with the molding of natural resin based animal chews such that the chews may be more efficiently released from the mold without the problems associated with standard ejector pin design.

SUMMARY OF THE INVENTION

A method of molding natural resins comprising supplying a mold with a mold cavity, wherein said mold cavity includes two mold parts which can be opened and closed and wherein said mold cavity further defines a surface area for a part to be molded, including a surface area of said part that remains in contact with said mold when said mold is open. A natural resin is provided having a moisture content of about 1–40% by weight, wherein said resin is selected from the group consisting of casein, starch, vegetable matter, comminuted rawhide, collagen, and mixtures thereof. Such natural resin with said moisture content is then introduced and heated in a heated injection molding machine and injected into said mold cavity and cooled, thereby forming a molded natural resin. An ejector plate is provided that is in communication with said mold cavity, the ejector plate including a lifter bar with a contacting area mounted on said ejector plate, wherein said lifter bar contacting area is 5.0–50.0% of the surface area of the molded part that remains in contact with said mold when said mold is open. This is followed by ejection of said molded part from said mold cavity including applying an ejecting force to said molded part with said lifter bars by contacting said contacting area of said lifter bar with said surface area of said molded part that remains in contact with said mold when open, and ejecting said molded part from said mold.

BRIEF DESCRIPTION OF THE DRAWINGS

Advantages of the present invention will be apparent from the following description of exemplary embodiments, which description should be considered in conjunction with the accompanying drawings, wherein.

DESCRIPTION OF THE PREFERRED EMBODIMENTS OF THE INVENTION

Figure 1:
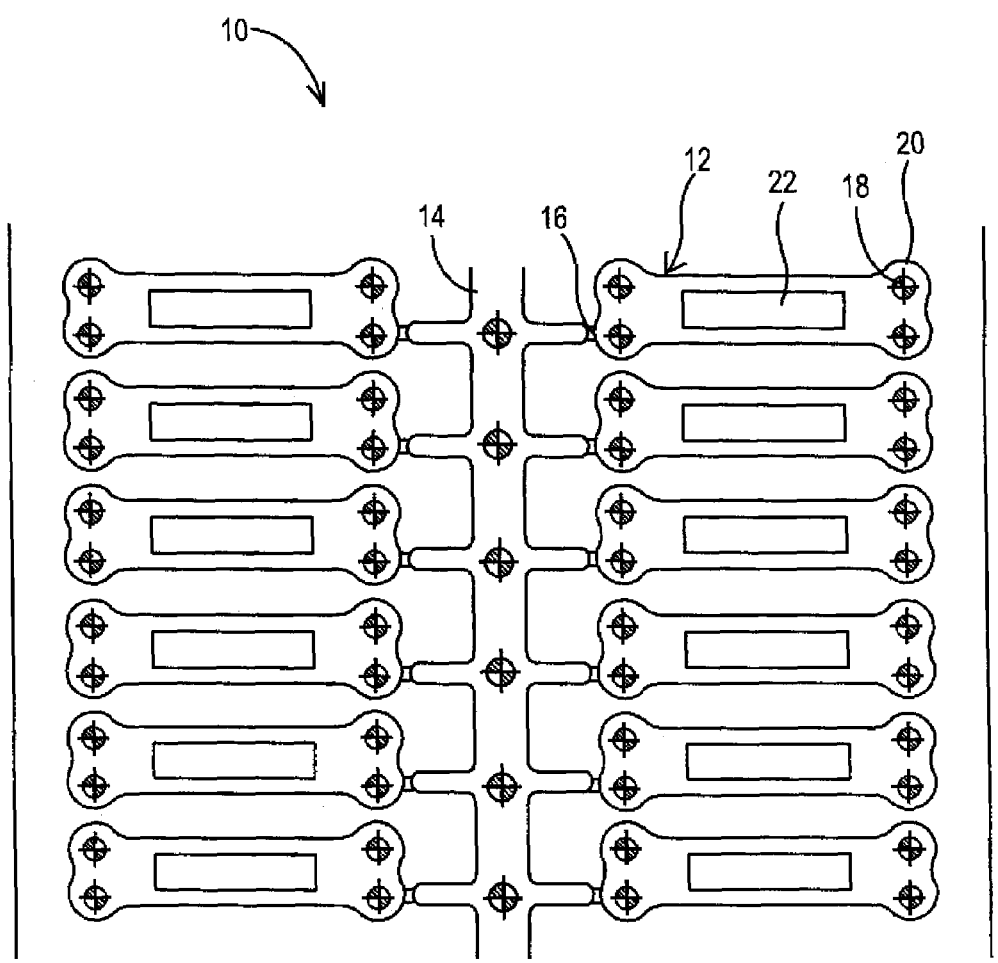
FIG. 1 illustrates a plan view of a portion of an exemplary mold consistent with the present invention.

In preferred embodiment, a system of molding edible/digestible animal chews is provided that results in a decreased in defects and increased productivity. Consistent with the present invention animal chews may be molded from natural resins that may be made to flow under conditions of elevated temperature and can be molded and cooled into a desired shape. Natural resins consistent with the present invention may include casein; starch, such as potato starch, vegetable starch; vegetable matter; comminuted rawhide; and denatured, partially hydrolyzed collagen and mixtures thereof. The resins may be mixed with water and molded to provide an animal chew containing between 1–40% wt. water after molding relative to the resin, more preferably 5–20% by weight moisture. Preferably, the natural resins may be injection molded into a mold including at least one lifter bar as part of the ejection system, which lifter bar, either alone or in conjunction with other removal mechanisms, such as ejector pins, facilitates removal of the molded natural resin from the mold.

More specifically, the present invention provides a system for molding animal chews of "natural resins" that are edible/digestible. Such natural resins may be further combined with desired attractants and/or flavorings, colorants, etc.

The exemplary natural resins herein therefore share a number of common physical characteristics. Notably within the context of the present invention, the water content of the resin following molding is typically in the range of between about 5–20%. Additionally, such natural resins generally experience adhesion to mold surfaces. The combination of the adhesion to mold surface and the softness resulting from the water content of the molded article therefore, prior the present invention, can make such natural resins difficult to mold.

For example, as noted earlier, when ejector pins push against the soft chews to extract the molded product, the ejector pins often at least partially penetrate the chew. The result may either be a complete puncture or a deep witness mark in the chew caused by the ejector pin. In either case, the chew may become unsuitable for marketing.

Consistent with the present invention, the system for molding animal chews includes plasticating (softening for use in a melt-processing operation) natural resin and any desired additives, for example using a screw-type injection molding apparatus. The plasticated natural resin may then be injected into a mold cavity defining a desired shape for the animal chew. Injection molding of the natural resin may preferably be accomplished in an injection molding machine at temperatures between about 150 degrees F. to about 400 degrees F., and pressures of about 1000 psi to about 2500 psi, depending upon the injection molding machine used, the particular mold, the size of the chew being molded, as well as the specific material from which the chew is being molded.

The natural resin may be injection molded into a mold including a lifter bar with a contacting surface as a portion of the demolding or ejection system, by which a molded article is removed from the mold. The lifter bar may include a longitudinal member having a distal contacting surface that defines a portion of the cavity. The lifter bar may be actuated to travel in the direction of demolding to apply an ejection pressure to the molded article. Preferably the lifter bar has a contacting surface area in the range of 5.0–50.0% relative to the surface area of the molded part that remains in contact with said mold when said mold is open.

Consistent with one representative example, the natural resin may be a starch, which must be combined with water to form a mixture that is suitable for melt processing techniques. In that regard, attention is directed at commonly owned U.S. Pat. No. 6,159,516, the teachings of which are incorporated by reference. There is disclosed a preferred process for forming starch into a molded article. The disclosed process makes use of melt processing techniques and includes combining starch and water wherein the water content is in the range of 20–40% by weight with respect to that of the starch. The starch water mixture may be introduced into an extruder that heats the mixture and discharges a product having a water content that is less than the water content of the mixture entering the extruder. The product may then be introduced into an injection molding machine and injection molded and cooled to form a molded article wherein the water content is at or below 20% by weight.

In one particular exemplary process of manufacturing an animal chew toy consistent with the present invention, starch and water are first combined wherein the water content is in the range of 20–40% wt. with respect to that of the starch. The mixture is introduced into a vented barrel extruder to form extruded beads, the beads having a water content upon discharge that is less than the water content of the mixture entering the extruder. The extrusion process may be followed by introduction of the extruded bead into a heated injection molding machine containing a mold and injection molding and cooling to form a molded article. The molded article desirable has a water content that is at or below 20% wt., and preferably in the range of 1–20% wt., and more preferably 5–20% by weight.

The injection molding machine includes a hopper feed section, a barrel, and an output nozzle, including a plurality of heating zones on the barrel extending from the hopper section to the nozzle. The plurality of heating zones may be set with the following exemplary and preferred temperature ranges: zone 1=at or below 70° F.; zone 2=at or below 150° F.; zone 3=at or below about 300° F.; zone 4=at or below 375° F. It should be pointed out that, in connection with the above exemplary process, the barrel temperature profile may conveniently be achieved by the use of cooling coils placed about the barrel of the injection molding machine. Such coils may comprise copper cooling coils containing circulating water.

The starch may be injected into a mold, wherein the mold itself may be cooled to about 35–65° F. The mold may include a cavity defining the desired shape of the molded article. After the molded article has cooled sufficiently to maintain its shape outside of the mold, the molded article may be ejected from the mold. Consistent with the present invention the mold may include lifter bars configured to provide a diffuse ejection force over a relatively large portion of the molded article during ejection.

In connection with the above exemplary process, an exemplary mold configured to overcome the difficulties associated with molding natural resins is generally illustrated in FIG. 1, wherein a portion of a mold 10 consistent with the present invention is illustrated in plan view. The illustrated portion of the mold 10 is the B-plate of the mold, i.e., the mold plate conventionally including an ejection assembly. The mold 10 may include several mold cavities 12 having a complimentary geometry to the desired molded article. The plural illustrated mold cavities should be construed as being generally analogous one to another for the purposes of this description. In this case, the mold cavity 12 is in the shape of a "dog bone", however, the present invention is susceptible to most any desired shape. Heated molding compositions may be provided from the injection molding apparatus through a sprue (not shown), then through runners 14 and gate 16 into the cavity 12. Desirably, more than one cavity may be distributed on the runners 14 in a manner that is generally balanced from a pressure drop standpoint.

Each mold cavity 12 may include conventional ejector pins 18 preferably associated with the bulbous portions 20 of the cavity 12. In addition to the conventional ejector pins 18, each cavity may include a lifter bar 22. The lifter bar 22 is generally a large surface area ejector that provides a less localized ejection force than a conventional ejector pin. Preferably the lifter bar 22 is configured to conform to the geometry of the cavity 12 with a contacting surface to the part to be molded in the region of the cavity 12 including the lifter bar 22.

Advantageously the lifter bar 22 is present having a surface area in the range of 5.0 to 50.0% of the surface area of the molded part that remains in contact with said mold when said mold is open. Surface areas of lifter bar 22 in this range provides a more efficient distribution of the ejection force for demolding a molded article of the present invention. Specifically, because the ejection force is distributed over a larger area there is a reduced likelihood that the lifter bar 22 will puncture the molded article or create a severe depression in the molded article. Accordingly, by utilizing lifter bars instead of, or in conjunction with traditional ejector pins, the rate of defects for molded natural resins have been greatly reduced, the ease to remove the molded part from the mold is reduced, and the need to use mold release agents is also reduced, or under certain circumstances, may be eliminated.

Figure 2:
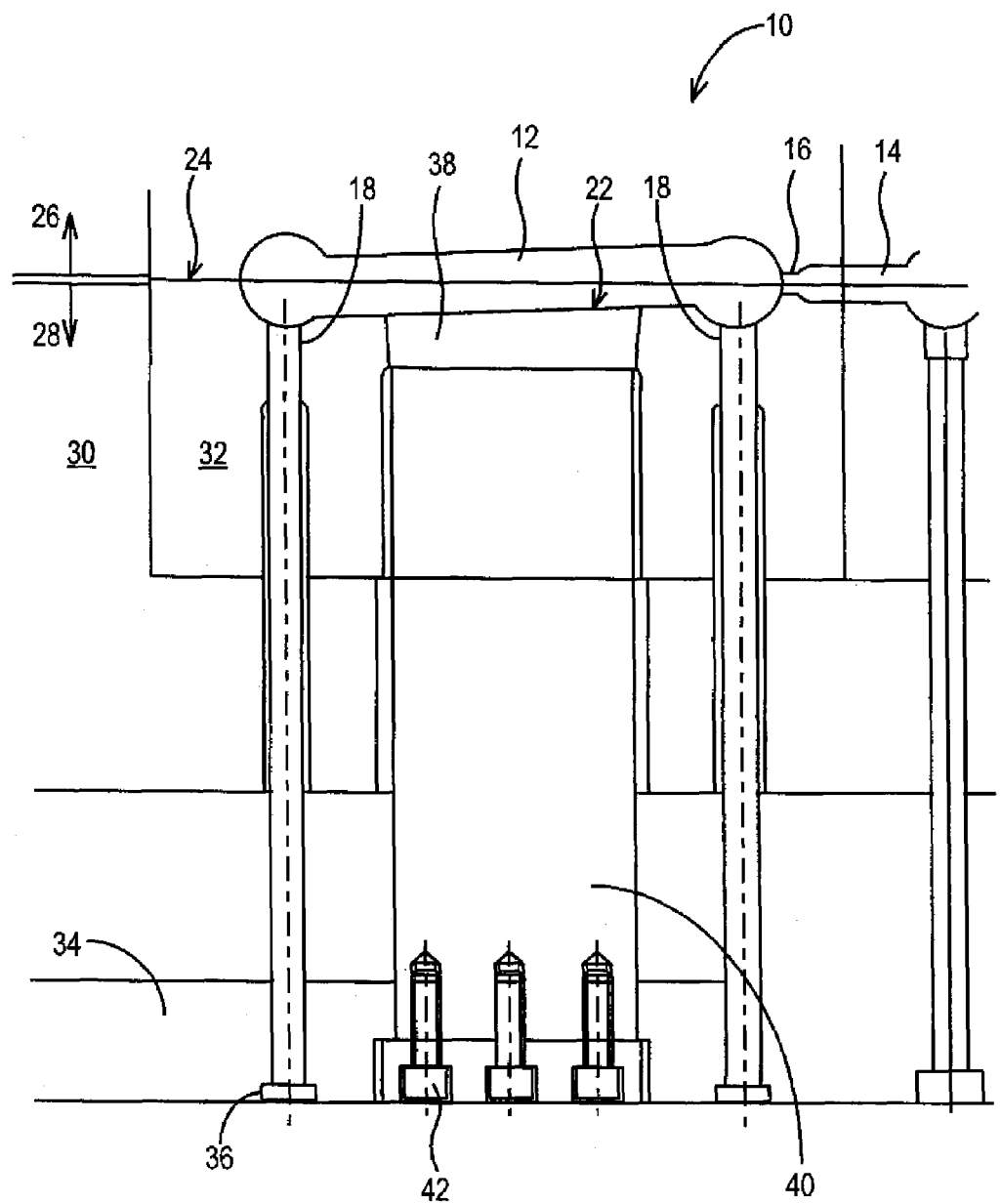
FIG. 2 is a simplified cross-sectional view illustrating an exemplary ejection system consistent with the present invention.

Turning to FIG. 2, a cross-sectional view of the mold portion 10 is shown extending from the parting plane of the mold down to the ejector plate of the mold. The cavity 12 may be generally bisected at parting plane 24, with the A-side of the mold 26 being disposed above the parting plane 24 and the B-side of the mold 28 being disposed below the parting plane 24. The B-side 28 of the mold may include a cavity plate, or B-plate 30 including the portion of the cavity 12 disposed on the B-side 28 of the mold. As illustrated, the actual cavity may be contained in a cavity insert 32.

Accordingly, those skilled in the art will appreciate that the part may be designed such that the part remains within the B-side of the mold so that it is conveniently ejected by use of the ejection system of the present invention. This can be accomplished by adjusting, e.g., the draft angle of the mold cavity so that the part is held more tightly on that part of the mold that contains the ejection system of the present invention.

Accordingly, the ejection system of the mold 10 is disposed in the B-side 28, including ejector pins 18, defining a portion of the cavity 12 associated with the bulbous portions 20 of the exemplary dog-bone cavity. Lifter bar 22 also defines a portion of the cavity 12 on the B-side 28 of the mold.

The ejector pins 18 and the lifter bar 22 may extend through the B-plate 30 and may be received through ejector retainer plate 34. The ejector retainer plate 34 may be supported on the bottom thereof by an ejector plate (not shown). The illustrated ejector pins 18 may be conventional cylindrical members extending form the ejector retainer plate 34 to the cavity 12, and may be retained to ejector retainer plate 34 by enlarged head portions 36. The lifter bar 22 may include a longitudinal member 40 extending from the ejector retainer plate 34 to the cavity, terminating in a distal member 38 with a contacting surface that defines a portion of the cavity 12. The longitudinal member 40 may be coupled to the ejector retainer plate 34, as by screws 42, and have a cross-section generally corresponding to the profile of the distal member 38, received in the cavity 12, although this need not be the case. The distal member 38 may also be preferably angled such that the region defining a portion of the cavity 12 has a larger cross-section than the portion adjacent to the longitudinal member 40. This angled aspect may allow the distal member 38 to seat in the cavity 12, thereby reducing seepage of injected material between the lifter bar 22 and the mold wall 32. While the lifter bar has been described as including a discrete longitudinal member 40 and distal member 38, the lifter bar may alternatively be formed as a single member having a distal region and a longitudinal region.

In use, a natural resin may be injected into the cavity 12 via the runners 14 and gate 16. After the natural resin is injected into the mold cavity 12, the resin may be allowed to cool and at least partially solidified. The mold may then be opened along parting plane 24. In the case of the illustrated exemplary mold 10, the molded article is preferentially be retained on the B-side 28 of the mold. The molded article may then be ejected from the cavity by advancing the ejector plate toward the cavity 12, thereby also advancing the ejector pins 18 and lifter bar 22 into the cavity 12. The surface area of the contacting surface of the ejector bar 22 relative to the surface area of the molded part that remains in contact with the B-side of the mold when the mold is open readily allows the molded article to be removed from the mold without pushing through the molded article are creating, among other things, a cosmetic defect thereon.

The illustrated and described exemplary embodiment therefore discloses a mold having an ejection system associated with the B-side of the mold. However, it will be appreciated by those having skill in the art that the mold is susceptible to modification whereby the either or both sides of the mold may be provided with an ejection system as disclosed herein. Special advantage may be had from a configuration wherein both sides of the mold are provided with an ejection system when the geometry of the molded article does not preferentially adhere to one side of the mold.

While the present invention has been described in terms of injection molding, the problems addressed by the present invention, that is, natural resins tend to be soft following molding and often adhere to mold surfaces are inherent in most molten state molding processes. Accordingly, in broad aspects, although the exemplary embodiment is directed at injection molding, any other type of molding process is contemplated, for example, compression molding as well as other thermoplastic processing techniques available in the art. Therefore the invention should not be interpreted as being limited by the disclosed exemplary embodiments, but rather only by the appended claims.

The invention claimed is:

1. A method of molding natural resins comprising:
   supplying a mold with a mold cavity, wherein said mold cavity includes two mold sides which can be open and closed and wherein said mold cavity further defines a mold surface for a part to be molded;
   providing a natural resin having a moisture content of about 1–40% by weight, wherein said resin is selected from the group consisting of casein, starch, vegetable matter, comminuted rawhide, collagen, and mixtures thereof;
   introducing and heating said natural resin to a heated injection molding machine and injecting said resin into said mold cavity and cooling said resin, thereby forming a molded part including a surface area that remains in contact with a portion of said mold surface when said mold is open;
   providing an ejector plate in communication with said mold cavity, the ejector plate including a lifter bar with a contacting area mounted on said ejector plate, wherein said lifter bar contacting area forms a portion of said mold cavity surface and said lifter bar contacting area is 5.0–50.0% of the surface area of the molded part that remains in contact with said mold surface when said mold is open;
   ejecting said molded part from said mold cavity including applying an ejecting force to said molded part with said lifter bars by contacting said contacting area of said lifter bar with said surface area of said molded part that remains in contact with said mold surface when open, and ejecting said molded part from said mold.

2. A method of molding an animal chew according to claim 1 wherein a moisture content of said resin after ejection is in the range of between about 5–20% wt.

3. A method of molding an animal chew according to claim 1, wherein providing said natural resin having a moisture content in the range of about 1.0–40% wt. comprises combining said natural resin and water to form a mixture wherein the water content is in the range of between about 1.0–40% wt. with respect to that of said natural resin.

4. A method of molding an animal chew according to claim 3, wherein providing said natural resin further comprises introducing and heating said mixture in an extruder to form extruded beads wherein the water content of said beads upon discharge from said extruder is less than the water content of said mixture introduced to said extruder.

5. The method of claim 1 wherein said injection molding machine includes a hopper feed section, a barrel, and an output nozzle, including a plurality of heating zones on the barrel extending from the hopper section to said nozzle, the heating zones comprising:

zone 1 at or below 70° F.;

zone 2=at or below 150° F.;

zone 3=at or below about 300° F.;

zone 4=at or below 375° F.

* * * * *